June 12, 1928.  1,673,204

E. ROBERTS

DRIVING MOUNT FOR CENTRIFUGAL MACHINES

Original Filed July 16, 1924   4 Sheets-Sheet 1

Inventor:
Eugene Roberts
by Geo. N. Goddard, Atty.

June 12, 1928. 1,673,204
E. ROBERTS
DRIVING MOUNT FOR CENTRIFUGAL MACHINES
Original Filed July 16, 1924    4 Sheets-Sheet 2
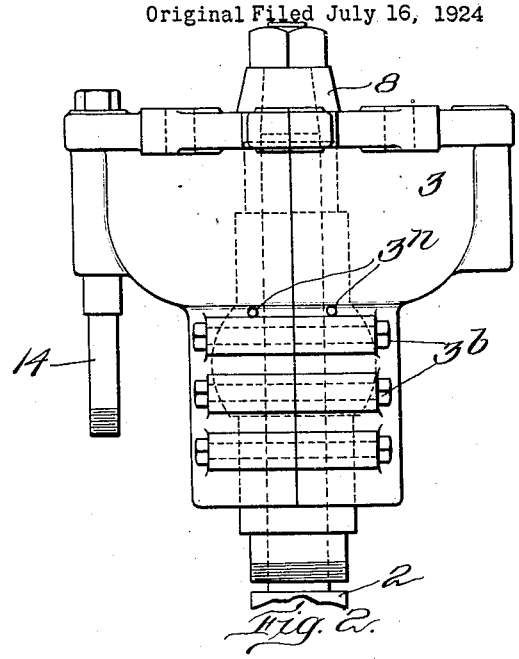
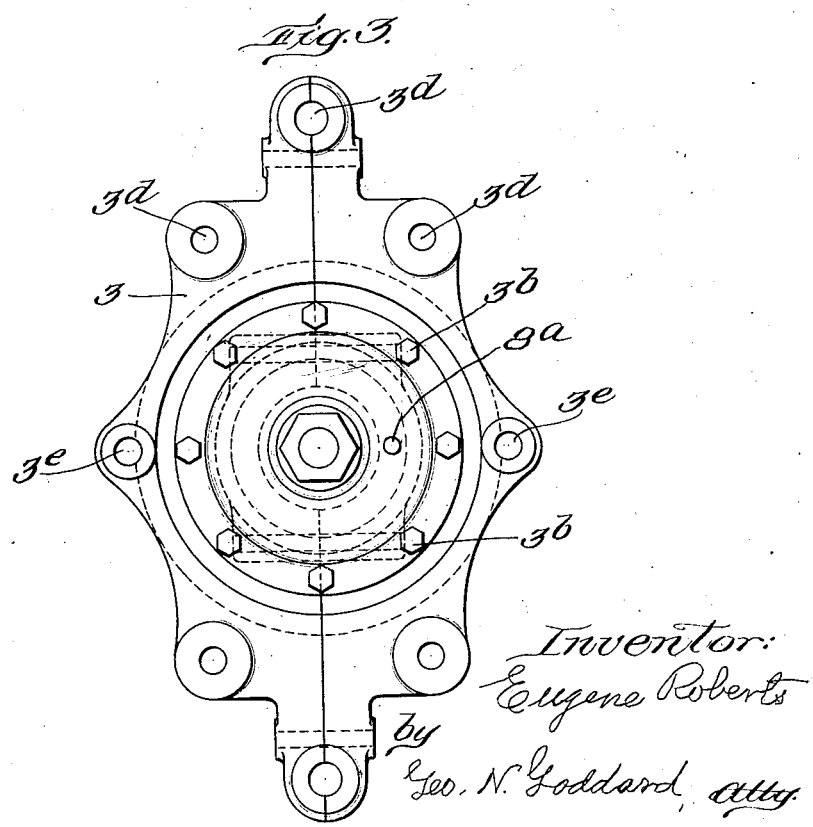

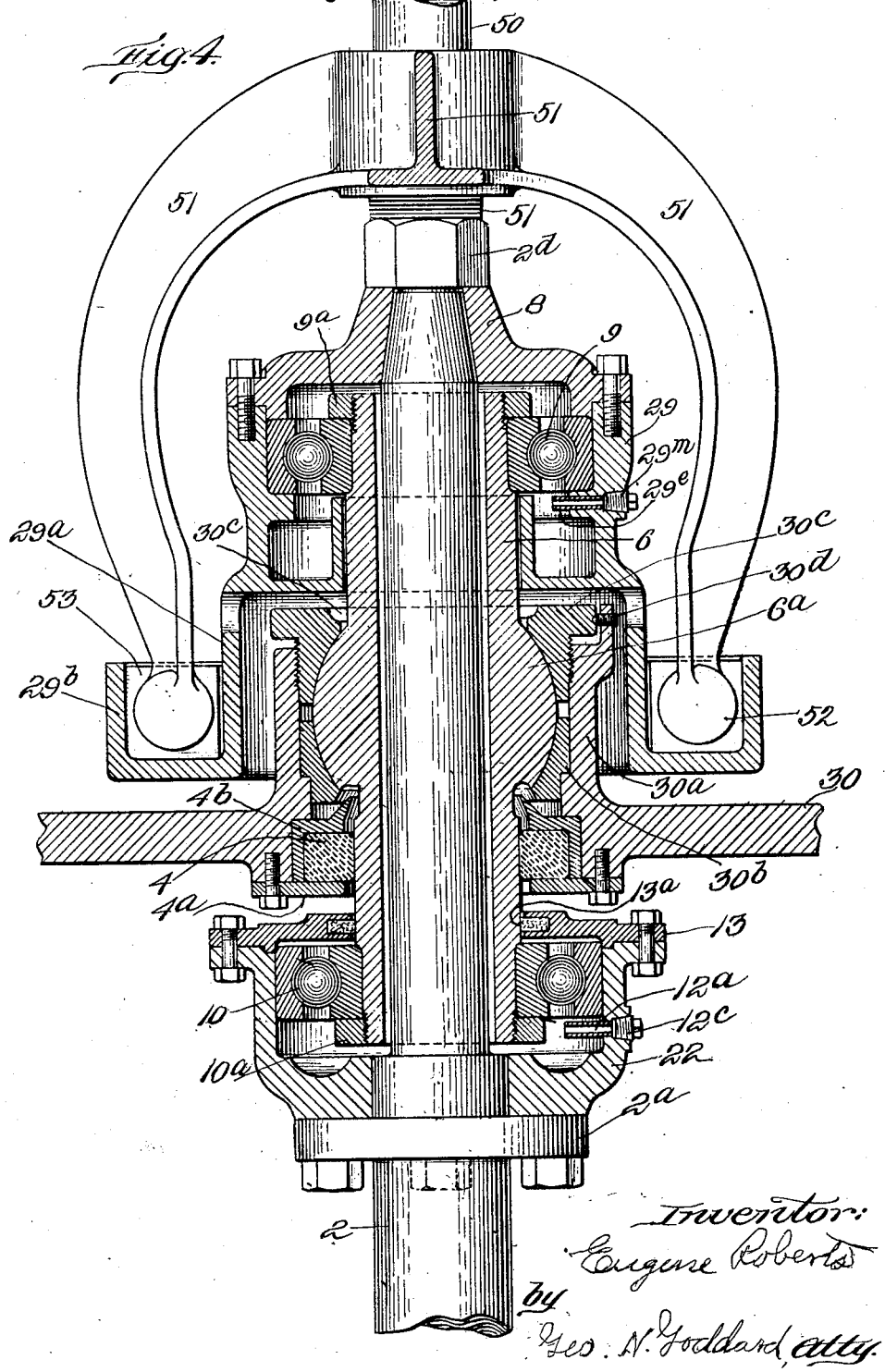

June 12, 1928. 1,673,204
E. ROBERTS
DRIVING MOUNT FOR CENTRIFUGAL MACHINES
Original Filed July 16, 1924 4 Sheets-Sheet 4
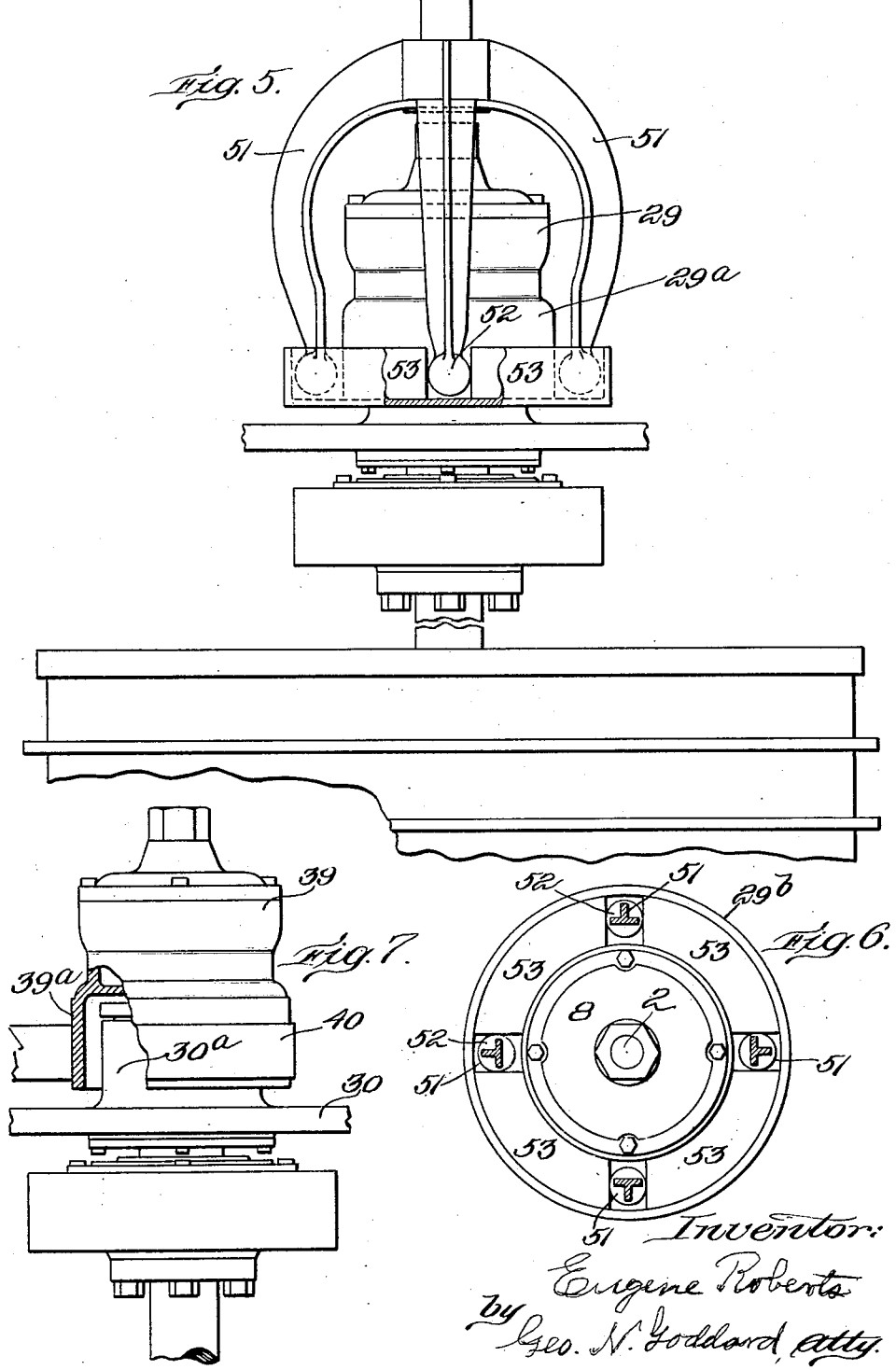
Inventor:
Eugene Roberts
by Geo. N. Goddard, atty.

Patented June 12, 1928.

1,673,204

UNITED STATES PATENT OFFICE.

EUGENE ROBERTS, OF HASTINGS UPON HUDSON, NEW YORK, ASSIGNOR TO THE WESTERN STATES MACHINE COMPANY, OF SALT LAKE CITY, UTAH, A CORPORATION OF UTAH.

DRIVING MOUNT FOR CENTRIFUGAL MACHINES.

Application filed July 16, 1924, Serial No. 726,383. Renewed September 1, 1927.

This invention relates to centrifugal machines, and particularly to centrifugals of the gyratory suspension type commonly used in sugar mills and refineries for the purification of sugar.

Owing the heavy unbalanced loads of wet sugar and the high speed of rotation to which these heavy machines are subjected, the conditions of service are extremely severe and cause much trouble and loss of time in consequence of the inability of the bearings to satisfactorily meet the conditions of prolonged operation. To allow the machines to quickly reach full operative speed and maintain it so as to shorten the cycle of operation and get full protection and conserve power, it is highly desirable to use anti-friction or ball bearings, but such bearings are found in practice to deteriorate very rapidly under the severe strains of service.

It is a chief object of the present invention to provide a construction and arrangement that will largely eliminate these troubles by securing such a distribution of the strains and such elimination of vibration, heating and deterioration of the bearings that the machine will quickly attain full speed, run smoothly and without substantial waste of power and will not cause injury to their supporting bearings.

To this end the invention, in a general way, comprises a construction and arrangement embracing widely spaced upper and lower ball bearings arranged upon opposite sides of the center of gyration at a sufficient distance therefrom to afford enough leverage to sustain, without injury, the shocks caused by violent swaying of unbalanced loads, and transmit them without hammering or vibration to a gyratory suspension head mounted in a spherical bearing seat permitting gyration against a yielding centralizing buffer or cushion, while both the suspension head and the rotary basket are positively maintained, without undue friction, against both lateral and vertical displacement with relation to an absolutely fixed center of oscillation.

Another feature of the present invention is the adequate provision made for complete lubrication of the bearings as well as ease of dismounting the machine for overhauling.

These and other features characterizing this invention will be fully explained in the following specification and will be defined in the claims hereto annexed.

As the present construction and arrangement is especially adapted to the application of driving power in different ways, both above and below the suspension hanger, I have illustrated two different forms of construction and arrangement illustrative of this fact in the accompanying drawings, of which:

Figure 2 is a side elevation of the suspension hanger shown in a plane at right angles to that of Figure 1.

Figure 3 is a plan view of the suspension hanger.

Figure 4 is a central sectional view showing a modified form of suspension and drive connection for the upper portion of the basket shaft and illustrating the application of driving power above the fixed hanger.

Figure 5 is a side elevation of the arrangement shown in Figure 4.

Figure 6 is a plan view showing the relations of the friction clutch driving elements according to the forms illustrated in Figures 4 and 5.

Figure 7 is a side elevation showing a modified form of drive in which a belt pulley is secured to the upper end of the basket shaft above the fixed hanger.

Figure 1:
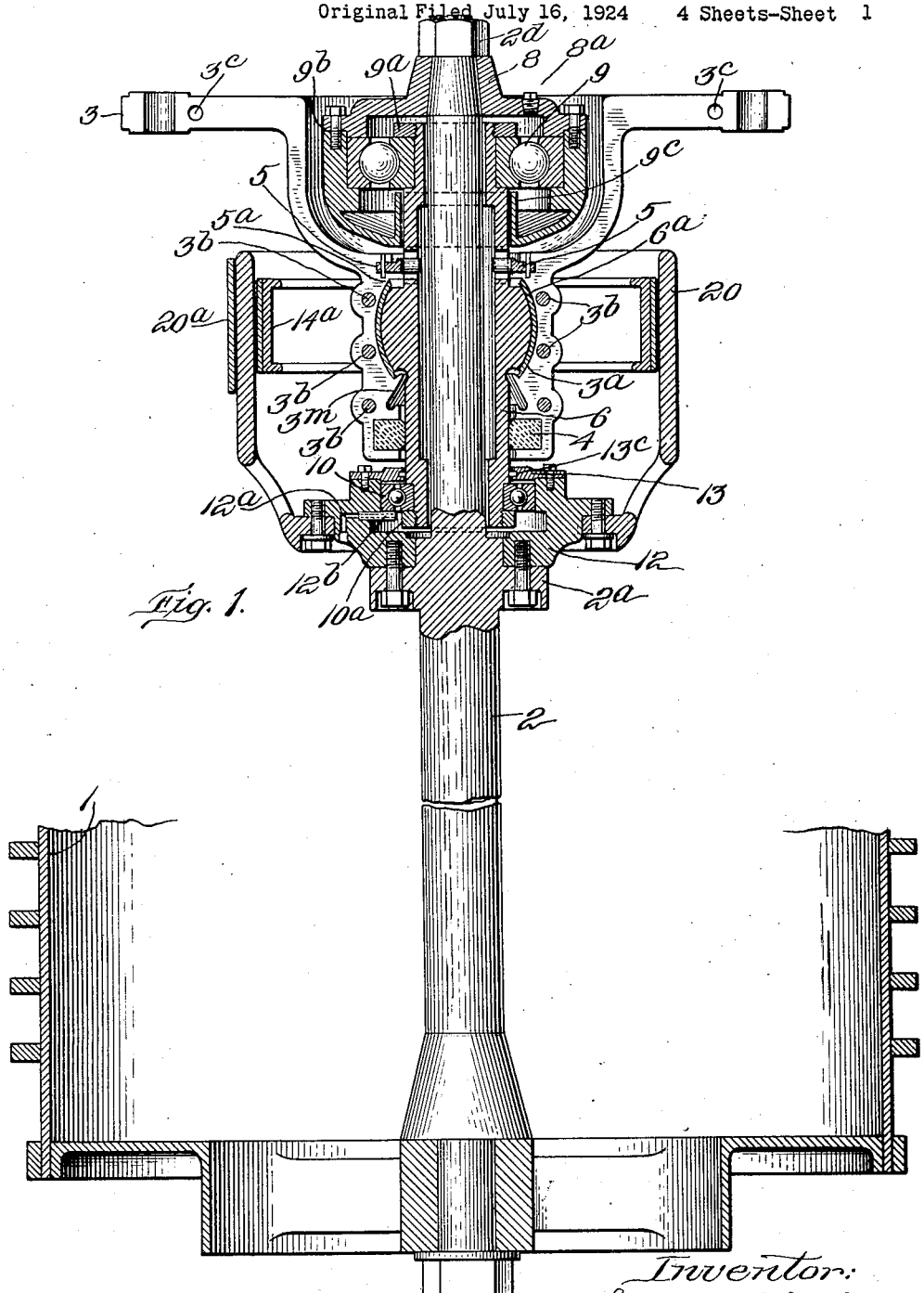
Figure 1 is a vertical central section of a centrifugal constructed in accordance with this invention, the centrifugal shaft being broken away at its middle portion to allow illustration on a large scale.

I will first describe the construction and arrangement shown in Figures 1, 2 and 3 in which the fixed hanger, from which the centrifugal is suspended, is divided vertically in order to facilitate easy dismounting of the machine and to provide a ball and socket seat for the gyratory non-rotating head so as to positively prevent both lateral and vertical displacement thereof under the strains of service.

The basket 1, and the lower part of the rotary basket shaft 2, are of the usual construction. The fixed hanger 3, however, is made in two vertical halves or sections each formed at 3ª with a spherically curved socket adapted to form a spherical seat for the spherically curved external suspension ball 6ª of the hollow suspension head 6, which is formed with a large central bore through which the upper end of the rotary basket shaft 2 passes, without contact.

After the hollow suspension head has been placed between them, the two sections of the hanger 3 are bolted face to face by means of the horizontal transverse bolts $3^b$ arranged on opposite sides of the spherical socket $3^a$. The lateral extensions or flanges at the upper part of the hanger are provided with additional bolt holes $3^c$ for the reception of additional tie bolts.

The upper horizontal flange portion of the hanger 3 is provided with suitable bolt holes $3^d$, for bolting it securely to the frame of the mixer, and is also provided with oppositely disposed vertical holes $3^e$ for the reception, respectively, of the brake-carrying post 14 and its actuating rod which is not here shown as it forms no part of the present invention.

An annular buffer 4 of elastic material, such as rubber, is inserted in an annular trough-like cavity formed in the lower end of the hanger 3 so as to snugly encircle the hollow suspension head 6 near its lower end to oppose, on all sides, a yielding resistance to the gyration of said head and having normally a centralizing tendency to maintain the central axis of said head in vertical position.

To prevent rotation of the suspension head 6, with relation to the fixed hanger, the latter is provided with one or more inserted members 5, having pins $5^a$ arranged to project into relatively larger apertures formed in the side of the hollow suspension head, while permitting the head to oscillate.

In order to distribute to the best advantage, the sidewise shock and pressure of the basket-shaft against its suspension head when the basket sways heavily from side to side, I provide an upper radial ball-bearing 9 and a lower radial ball-bearing 10 whose inner races are firmly clamped to the outside reduced end portions of the gyratory head 6 by any suitable means, as by the threaded clamping rings $9^a$ and $10^a$. In order to simplify the construction I employ at least one of these bearings, and preferably the upper one, as a thrust bearing not only to sustain the weight of the basket and its load but also to positively prevent any lifting of the basket axially or vertically under the strains induced by its gyrating load. With the end in view, the outer race of the upper ball-bearing 9 is clamped between the thrust cap 8, which is securely bolted to the upper end of the shaft, and a clamping ring $9^b$, which is bolted to the peripheral flange of the thrust cap 8, so as to clamp the outer ball race firmly against the underside of the thrust cap. This clamping member $9^b$ may also be used to serve as an oil reservoir and for that purpose is provided, at its inner edge, with an annular upstanding sleeve or flange $9^c$, extending nearly up the inner ball race. In consequence of this arrangement a plentiful supply of oil for lubricating the bearing may be provided, while drip or leakage is prevented, the oil being supplied through a plugged orifice $8^a$ in the thrust cap.

It will be observed that the ball bearing shown has its outer and inner races cut very deeply so as to overhang a considerable portion of the surface of the ball, this construction being used in order that the same bearing may act both as a radial bearing for sustaining side thrust, as well as a thrust bearing for sustaining and preventing axial movement or displacement of the shaft in either direction.

Immediately below the lower end of the suspension head 6, the basket shaft 2 is provided with an annular flange $2^a$, to which is bolted an annular spider 12, interiorly recessed to receive the lower ball-bearing 10, which is interposed between the suspension head and said spider. The interior recess of the spider is closed by a cover or lid 13, which may be provided with a protective oil wick $13^a$ to prevent escape of oil. In order that just the right quantity of oil and no more may be supplied to this oil recess in the spider 12, an overflow passage $12^a$ is provided which allows the oil to run off if filled above the level of the passage. To prevent the oil from escaping through this overflow, when the machine is running, there is inserted an inwardly extending tube $12^b$, whose inner end passes inside of the vertical line of the built-up wall of oil which results from the rapid rotation of the shaft. That is, it extends inward beyond the inner face of the outer ball-race so that the bearing balls are partly immersed in oil when the machine is running.

By locating the two radial ball-bearings on opposite sides of the center of gyration it is possible to secure a wide separation and, consequently, long and effective leverage sustaining the lateral sway of the basket and transmitting it to the gyratory head without unduly lengthening the basket shaft below the center to make provision for such a long bearing. By reason of this long leverage the springing of the shaft is prevented, while the side strains are more easily distributed over the bearings. At the same time the centralizing buffer 4 is located between the shaft bearings, but at a sufficient distance to render effective resistance to the gyration of the suspension head and basket shaft. A combined driving and brake pulley 20 is detachably secured to the shaft 2 by direct connection with the spider 12, and is extended upward to surround the equatorial plane of the gyratory head, that is, the horizontal plane coinciding with the center of oscillation. In this position the belt $20^a$, pulls directly against the center of the socket and has no tendency to lift the suspension head from its seat. Two internal brake shoes 14ª, suspended on the vertical brake-post 14, can be located to apply their friction in the same equatorial plane.

To protect the elastic buffer 4 against any possibility of drip from the ball and socket joint I provide around the interior of the lower portion of the hanger 3 a channel or recess $3^m$, so formed as to allow any seepage of grease to seep down to its bottom where it is retained without its being permitted to flow farther and reach the buffer. As but little lubricant is needed, and as it will usually be in the form of a thick grease, this grease-catching recess is effective to protect the buffer. It may be injected through holes in the wall of the hanger 3 located just above the level of the spherical ball as indicated at $3^n$.

In the form of the invention above described the belt pulley which forms the driving member is applied to the shaft intermediate of its ends and below the center of gyration.

In the form now to be described, shown in Figures 4, 5 and 6, the driving element is secured to the upper end of the shaft above the center of gyration, and also above its bearings. In this form of the invention the gyratory suspension head 6, with its spherical exterior supporting ball $6^a$, the basket-shaft 2, the thrust cap 8, and the upper and lower bearings 9 and 10 may have precisely the same construction as that already described and need not, therefore, be described in detail.

The fixed hanger 30, instead of having a depending socket member, and instead of being divided vertically into two halves or sections, is provided with an upstanding flange $30^a$ and is made integral without vertical division. For convenience it may be provided with a lower seat member $30^b$ which is fixed in place, and an upper socket member or interiorly curved bearing $30^c$ which has threaded engagement with the interior of the flange $30^a$ so as to permit it to be adjusted into close but not clamping contact with that portion of the spherical bearing ball $6^a$ above the equatorial plane of the head. In consequence of this arrangement the gyratory head is held positively against vertical or sidewise displacement, while being permitted free oscillation against the centralizing resistance offered by the buffer 4. The upper socket member or bearing $30^c$, is formed with an annular grease-trough or recess $30^e$ to supply lubricating grease to the spherical bearing.

The elastic buffer 4 is retained in place by a retaining ring $4^a$, secured to the bottom face of the hanger and is protected from grease from the spherical bearing by means of the inwardly projecting flanged ring $4^b$.

The annular clamping member 29, which secures the outer ball-race of the upper ball bearing 9 securely in position, is provided with an interior oil reservoir to afford lubrication to the bearing and has an inwardly projecting oil tube $29^e$ inserted in the oil recess so as to project inward to the middle line of the bearing. The outer end of the bore in which it is inserted is normally closed by a screw plug $29^m$. This opening, as similarly explained, above, prevents filling the oil chamber above a certain level and prevents any leakage due to centrifugal pressure of the oil against the screw plug because the inner end of the tube extends inwardly beyond the walled-up oil when the machine is running.

The form shown in Figures 4, 5 and 6 is designed to be driven from an overhead drive shaft 50 axially aligned with the basket-shaft 2, and having a clutch drive connection, as will now be explained. The race clamping ring 29 has a downward extension $29^a$, surrounding the equatorial line of the suspension ball $6^a$, and is then extended outwardly and upwardly to form a trough-like flanged friction pulley $29^b$ in which are loosely mounted arcuate friction blocks 53. Between the adjacent ends of these blocks are interposed the lower ball ends or paws 52 of the downwardly extending arms 51 of a spider that is secured to the lower end of the drive shaft 50. When the drive shaft is set in rotation by any appropriate driving means the ball paws 52 cause the friction blocks to travel at the same rate of speed around the interior of the friction pulley $29^b$ which they grip with powerful friction under the influence of centrifugal force, thus transmitting their revolution about the equatorial plane of the ball suspension head to the rotary shaft. The upper shaft is a non-gyratory shaft but as the application of power through the driving clutch is made in the plane of the center of gyration there is no interference with the gyratory movement of the centrifugal, and there is no transmission of side strain to the driving shaft rotating about a fixed axis, while there is perfect balance at all times because of the absence of unequal stresses on opposite sides of the driving pulley.

As in the form first described, the gyratory suspension head is compelled to gyrate about an absolutely fixed center and the rotary basket shaft is held positively against axial displacement in either direction by anti-friction bearings.

The annular spider 22, supporting the lower ball bearing of the machine, is in all substantial respects like the corresponding spider 12 of the first described form, except that no provision is made for attaching the underneath driving pulley.

In Figure 7 I have shown how it is possible, by using the same form of hanger 30, with the upstanding flange 30ᵃ, to employ a belt driven pulley 39ᵃ forming part of the upper race clamping ring 39, and receiving the driving belt 40 in the horizontal plane of the center of oscillation.

From the foregoing it will be seen that the same construction and arrangement for suspending a gyratory centrifugal may be used for the application of overhead drive or for the application of a drive below the level of the hanger, and in both cases the power may be applied directly opposite the center of gyration, that is, in the neutral position, merely by supplying an appropriate form of fixed hanger. Access may be had to the upper bearing of the machine by merely unscrewing the top nut 2ᵈ, after the cover 13 has been detached from its supporting spider. The machine is very readily dismounted from the hanger for the cleansing or inspecting of parts or renewals. The entire absence of any vertical or lateral displacement eliminates completely the hammering on ball bearings and the vibration, both of which led to rapid deterioration of the bearings where no provision was made for preventing the slight lifting or unseating of the machine caused by violent swaying against its yielding buffer.

The different forms of the invention illustrated have, as common characteristics, the prevention of vertical and lateral displacement of the gyratory suspension head with relation to a fixed center by reason of the engagement of the suspension ball both above and below the center of gyration with the divided suspension or socket seat, the radial and axial support in both directions of the rotary shaft by radial ball bearings mounted on the upper and lower ends of the gyratory head, which are themselves encircled by flanged spiders secured to the shaft above and below said head, as well as by a construction of the suspension head which allows the application of the driving power either from an overhead shaft, by means of suitable connection, or by a driving belt located either above or below the fixed center in the horizontal plane of the center of oscillation and intermediate of the upper and lower rotary bearings. In all cases ample and complete provision is made for lubricating the bearings, while the placing of the rotary bearings outside of the gyratory head and supporting the shaft thereon, by means of outwardly projecting flanged spiders, permits the convenient use of large size bearing elements capable of easily sustaining the stresses and thrusts to which they are subjected in service, while completely avoiding such hammering or vibration as tends to flatten and roughen the balls and cause their rapid deterioration.

It will be understood that the vertical division of the hanger into two parts may be advantageously applied whether the portion of the hanger containing the suspension socket extends upward or downward from the horizontal supporting flange since, in either case, the removal of one half of the hanger will expose the gyratory head containing the suspended basket shaft so that they may be removed bodily in assembled relation from the remaining half of the hanger. This construction greatly facilitates the erecting or taking down of the machine where there is little head-room between the top of the curb or casing that surrounds the basket and the overhead structure that supports the machine. Whether the socket members, forming the suspension seat, are separated from each other on a vertical plane, or on a horizontal plane, it will be clear that in both cases the axial lifting or displacement of the suspension head from its seat is positively prevented while permitting the required degree of gyration.

What I claim is:

1. A gyratory centrifugal of the suspended type, embracing in combination a hollow non-rotating gyratory suspension head formed with an exterior suspending ball intermediate of its ends, a fixed hanger provided with separate opposed socket members forming a separable suspension seat for said suspending ball engaging it on all sides, both above and below the center of gyration, radial ball-bearing elements mounted on the upper and the lower ends of said gyratory head, and a rotary gyratory basket shaft having outwardly extending upper and lower spiders encircling said ball-bearing elements to rotatably support said basket-shaft and prevent axial displacement with reference to a fixed center of gyration, substantially as described.

2. In a gyratory suspended centrifugal, the combination of a non-rotating hollow suspension head provided, intermediate of its ends, with a spherical suspending ball, a radial ball bearing element firmly secured on the outside of each end of said gyratory head, a centrifugal rotary basket shaft, upper and lower supporting spiders secured thereto and provided with flanged extensions encircling said ball bearing elements, one of said rotary bearings being formed to support the axial thrust of the shaft in both directions, each of said spiders being provided with an annular oil chamber for supplying lubrication to its adjacent bearing element, substantially as described.

3. In a suspended gyratory centrifugal machine, the combination of a fixed hanger provided with two opposed separate socket members forming a suspension seat for the centrifugal, a hollow gyratory head provided, intermediate of its ends, with an exterior ball member adapted to be seated in said socket members and held against lateral and upward displacement thereby, a rotary basket-shaft rotatably supported against lateral and against axial thrust in both directions by anti-friction bearings disposed outside of said gyratory head above and below the center of gyration, and a driving element secured to said rotary shaft and disposed to surround the hanger at the level of the center of gyration, substantially as described.

4. In a suspended gyratory centrifugal machine, the combination of a fixed hanger provided with a spherically curved socket forming a suspension seat for the centrifugal, a gyratory suspension head provided with a spherically curved suspension ball adapted to be seated in said socket and to be held thereby against lateral and upward displacement so as to insure gyration about a fixed center, said hanger being divided on a plane diametrical of said ball through said socket into two sections detachably secured together, and a basket-carrying shaft rotatably suspended from said gyratory head, substantially as described.

5. In a suspended gyratory centrifugal, the combination of a fixed socketed hanger forming a suspension seat for the centrifugal, said hanger being made in two separable halves detachably secured together, a hollow gyratory suspension head provided, intermediate of its ends, with a spherically curved suspension ball adapted to be seated in the socketed portion of said hanger so as to gyrate without axial displacement in either direction, a rotary basket-supporting shaft centrally mounted in said gyratory head and rotatably supported thereon to gyrate therewith by means of anti-friction bearing elements carried on the upper and the lower ends of said gyratory head, substantially as described.

6. In a gyratory, suspended centrifugal machine, the combination with a socketed suspension hanger, of a non-rotating gyratory suspension member seated in the hanger socket to gyrate against centralizing resistance, a rotary basket-suspending shaft, upper and lower antifriction radial bearing elements secured to the exterior of said suspension member in fixed axially spaced relation, upper and lower shaft-supporting members forming means for transmitting to the non-rotary suspension member through said radial bearing elements, the axial and lateral thrusts of the rotating and gyrating basket shaft.

7. In a suspended gyratory centrifugal machine, the combination of a hollow gyratory suspension head provided, intermediate of its ends, with a suspension ball adapted to be seated in a surrounding suspension socket, radial ball bearing elements secured on the outside of both the upper and the lower ends of said suspension head, a radial basket-carrying shaft extending through said suspension head, radial spiders secured to said shaft immediately above and below the opposite ends of said suspension head, said spiders being provided with annular axially projecting members adapted to receive the radial ball-bearing elements and to afford annular oil chambers for supplying oil thereto, one of said bearing elements acting to sustain the axial thrust of said shaft, substantially as described.

8. In a gyratory suspended centrifugal, the combination of a hollow non-rotary gyratory suspension member provided intermediate of its ends with exterior supporting means permitting it to gyrate against yielding resistance, upper and lower antifriction radial bearing elements mounted around the outside of the opposite ends of said member, a central rotary basket-carrying shaft, upper and lower supporting spiders secured to said shaft to form overlapping external engagement with said bearing elements to rotatably support the shaft against lateral and axial thrust, substantially as described.

9. In a gyratory suspended centrifugal, the combination of a hollow non-rotary gyratory suspension member provided intermediate of its ends with exterior supporting means permitting it to gyrate against yielding resistance, upper and lower antifriction radial bearing elements mounted around the outside of the opposite ends of said member, a central rotary basket-carrying shaft, upper and lower supporting spiders secured to said shaft to form overlapping external engagement with said bearing elements to rotatably support the shaft against lateral and axial thrust, one of said spiders being extended to surround the suspension member at the centre of gyration to afford shaft-rotating means in the plane of the gyratory centre.

10. In a suspended gyratory centrifugal, the combination of a tubular gyratory suspension element provided intermediate of its ends with a spherically curved supporting ball adapted to seat in a socket hanger, a centralizing elastic buffer interposed between the gyratory member and the hanger below said ball, exterior ball-bearing elements secured around the outside of the opposite ends of said suspension member, upper and lower flanged spiders secured to the shaft to surround said ball bearing elements, the upper spider being extended down around the centre of gyration to form a shaft-rotating element, and a rotary driving means arranged to have driving engagement with said shaft-rotating member.

11. In a suspended centrifugal, the combination of a tubular gyratory non-rotating suspension head having ball and socket support in a fixed hanger to gyrate against yielding centralizing resistance, a rotary basket-carrying shaft extending axially through said tubular head, upper and lower anti-friction radial bearing elements secured around the exterior of said bearing head in axially spaced relation and arranged to transmit the radial and the axial thrusts from the gyratory basket-shaft to said gyratory head, an overhead aligned non-gyrating drive shaft and co-acting drive-transmitting elements secured to the adjacent ends of the respective shafts to form a flexible driving connection outside the gyratory head at the level of the center of gyration whereby the transmission of lateral strains from the gyrating basket-shaft to the drive-shaft is prevented.

In witness whereof, I have subscribed the above specification.

EUGENE ROBERTS.